United States Patent
Sun et al.

(10) Patent No.: US 10,523,271 B2
(45) Date of Patent: Dec. 31, 2019

(54) CABLE MODEM ECHO CANCELLATION TRAINING IN FULL DUPLEX COAXIAL NETWORKS

(71) Applicant: Futurewei Technologies, Inc., Plano, TX (US)

(72) Inventors: Yanbin Sun, Shenzhen (CN); James Jeng Chen, Corona, CA (US); Tao Ouyang, Shenzhen (CN)

(73) Assignee: Futurewei Technologies, Inc., Plano, TX (US)

( * ) Notice: Subject to any disclaimer, the term of this patent is extended or adjusted under 35 U.S.C. 154(b) by 0 days.

(21) Appl. No.: 16/022,252

(22) Filed: Jun. 28, 2018

(65) Prior Publication Data
US 2019/0028145 A1 Jan. 24, 2019

Related U.S. Application Data

(60) Provisional application No. 62/534,499, filed on Jul. 19, 2017.

(51) Int. Cl.
*H04B 3/23* (2006.01)
*H04B 1/04* (2006.01)
*H04L 5/14* (2006.01)

(52) U.S. Cl.
CPC .......... *H04B 3/238* (2013.01); *H04B 1/0475* (2013.01); *H04B 3/231* (2013.01); *H04L 5/143* (2013.01)

(58) Field of Classification Search
CPC ...... H04B 3/238; H04B 3/231; H04B 1/0475; H04L 5/143
See application file for complete search history.

(56) References Cited

U.S. PATENT DOCUMENTS

| 5,970,088 | A  | * | 10/1999 | Chen ...................... | H04L 1/0003 370/201 |
| 6,510,152 | B1 | * | 1/2003  | Gerszberg ............ | H04M 1/2478 348/E7.078 |
| 2018/0294941 | A1 | * | 10/2018 | Chapman ................ | H04L 5/003 |
| 2018/0343031 | A1 | * | 11/2018 | Yagil ...................... | H04B 3/232 |

OTHER PUBLICATIONS

"Data-Over-Cable Service Interface Specifications DOCSIS© 3.1", MAC and Upper Layer Protocols Interface Specification, CM-SP-MULPIv3.1-114-180130, Copyright 2013-2018 Cable Television Laboratories, Inc., (Jan. 30, 2018), 901 pgs.

"FDX DOCSIS®: System Architecture Overview", Copyright 2016 Cable Television Laboratories, Inc., (Jul. 2016), 13 pgs.

* cited by examiner

*Primary Examiner* — Mohammad S Anwar
(74) *Attorney, Agent, or Firm* — Schwegman Lundberg & Woessner, P.A.

(57) ABSTRACT

A method, system, and apparatus for calibration for cable modem (CM) echo cancellation (EC) training in full duplex (FDX) coaxial networks is provided. A CM receives a current resource block assignment message (RBA) from a cable modem termination system (CMTS), and determines if designated channels available for assignment as downstream (DS) channels or upstream (US) channels have changed assignment values from a previously received RBA, and if EC training has been performed on the designated channels for the current RBA. If the designated channels have changed assignment values and EC training has not been performed on the designated channels for the current RBA, the CM performs EC training on the designated channels for the current RBA.

20 Claims, 7 Drawing Sheets

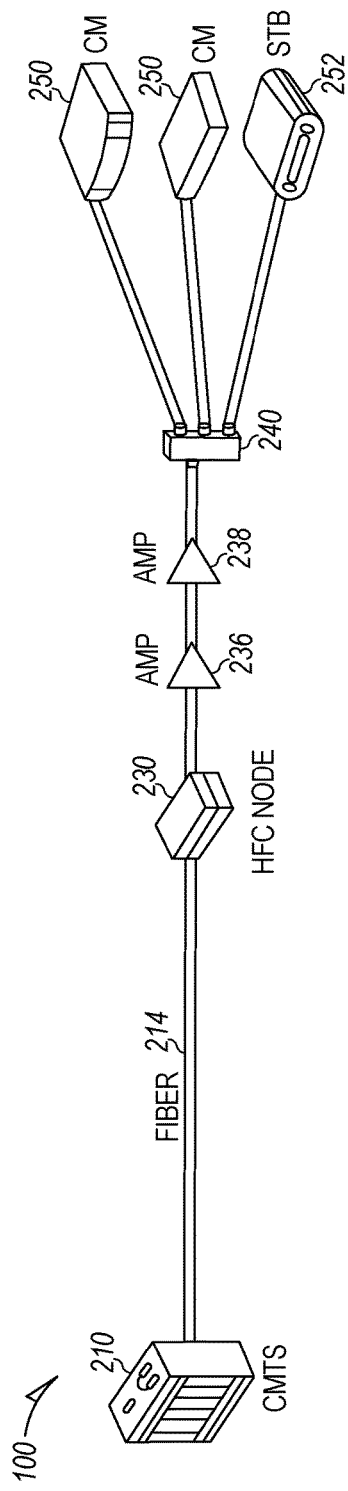
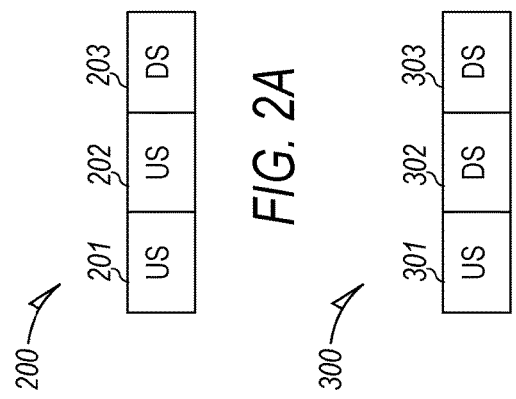
FIG. 1
FIG. 2A
FIG. 2B

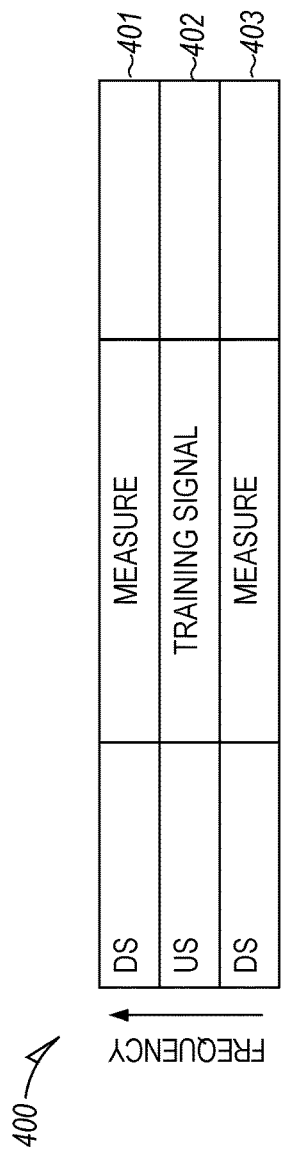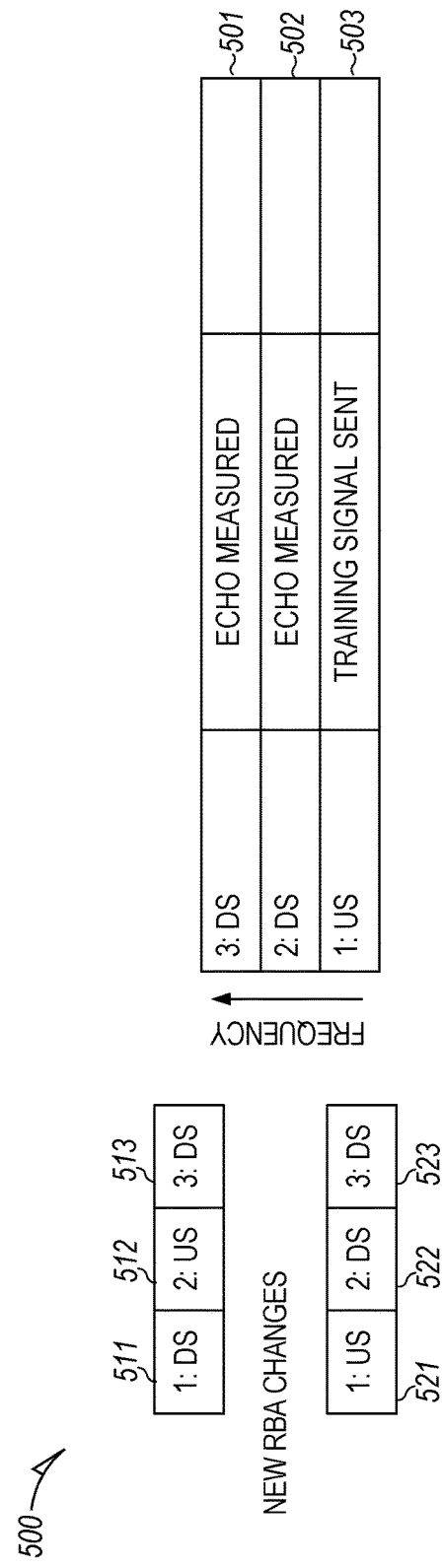
FIG. 4
FIG. 5

CABLE MODEM ECHO CANCELLATION TRAINING IN FULL DUPLEX COAXIAL NETWORKS

CROSS-REFERENCE TO RELATED APPLICATIONS

The present application claims the benefit under 35 U.S.C. § 119(e) of U.S. Provisional Patent Application 62/534,499, filed Jul. 19, 2017, the disclosure of which is hereby incorporated by reference herein in its entirety.

This application is related to co-pending, commonly assigned, U.S. patent application Ser. No. 15/988,746, entitled "UPSTREAM ECHO CANCELLATION IN FULL DUPLEX COMMUNICATIONS", filed on May 24, 2018, which is hereby incorporated by reference in its entirety.

TECHNICAL FIELD

The present disclosure relates to full duplex (FDX) coaxial network communications, and in particular to systems and methods for cable modem (CM) echo cancellation (EC) training in FDX coaxial networks.

BACKGROUND

A cable modem termination system (CMTS) allocates bandwidth for one or more upstream and/or downstream channels for a CM. Bandwidth allocated to one CM may be allocated across multiple channels upon which the CM can transmit or receive. FDX Data Over Cable Service Interface Specification (DOCSIS) defines sub-bands to be used for either downsteam (DS) transmission to CMs or upstream (US) transmission from CMs.

SUMMARY

Methods, apparatus, and systems are provided for cable modem (CM) echo cancellation (EC) training in full duplex (FDX) coaxial networks. Various examples are now described to introduce a selection of concepts in a simplified form that are further described below in the detailed description. The Summary is not intended to identify key or essential features of the claimed subject matter, nor is it intended to be used to limit the scope of the claimed subject matter.

According to one aspect of the present disclosure, a method for calibration for CM EC training in FDX coaxial networks is provided. A CM receives a current resource block assignment message (RBA) from a cable modem termination system (CMTS), and determines if designated channels available for assignment as downstream (DS) channels or upstream (US) channels have changed assignment values from a previously received RBA, and if EC training has been performed on the designated channels for the current RBA. If the designated channels have changed assignment values and EC training has not been performed on the designated channels for the current RBA, the CM performs EC training on the designated channels for the current RBA.

Optionally, in any of the preceding aspects, a further implementation of the aspect includes determining, by the processor at the CM, if any of three designated channels have changed assignment from a previously received RBA. Optionally, in any of the preceding aspects, a further implementation of the aspect includes using a look-up table or training matrix. Optionally, in any of the preceding aspects, a further implementation of the aspect includes using a one-dimensional vector to record binary values as indications of whether EC training has been performed on the designated channels for each of a plurality of possible combinations of RBA, excluding RBAs where the designated channels have been assigned as all DS channels or all US channels.

Optionally, in any of the preceding aspects, a further implementation of the aspect includes setting a binary value to indicate EC training has been performed for the current RBA upon completion of EC training on the designated channels for the current RBA. Optionally, in any of the preceding aspects, a further implementation of the aspect includes setting a full EC training indication if all binary values in the one-dimensional vector indicate EC training has been performed for each of the plurality of possible combinations of RBA, excluding RBAs where the designated channels have been assigned as all DS channels or all US channels. Optionally, in any of the preceding aspects, a further implementation of the aspect includes sending a notification to the CMTS to indicate that EC training is to be initiated for the current RBA. Optionally, in any of the preceding aspects, a further implementation of the aspect includes transmitting a training signal on an US channel and measuring, by the processor at the CM, an echo signal or signal leakage on DS channels adjacent to the US channel. Optionally, in any of the preceding aspects, a further implementation of the aspect includes sending a request to the CMTS that EC training is to be initiated for the current RBA, and receiving a grant from the CMTS that EC training can be initiated for the current RBA.

According to another aspect of the present disclosure, a system for CM EC training in FDX coaxial networks is provided. The system comprises one or more processors at a CMTS, the one or more processors at the CMTS configured to send a current RBA to a plurality of CMs. The system also comprises one or more processors at a first CM of the plurality of CMs, the one or more processors at the first CM configured to receive the current RBA from the CMTS, and determine if any designated channels available for assignment as DS channels or US channels have changed assignment from a previously received RBA. Based on the determination that one or more of the designated channels have changed assignment from the previously received RBA, the one or more processors at the first CM determines that the designated channels have not been assigned as all DS channels or all US channels, and based on the determination that the designated channels have not been assigned as all DS channels or all US channels, determines that EC training has not been performed on the designated channels for the current RBA. Based on the determination that EC training has not been performed on the designated channels for the current RBA, the one or more processors at the first CM performs EC training on the designated channels for the current RBA.

Optionally, in any of the preceding aspects, a further implementation of the aspect includes sending a notification to the one or more processors at the CMTS to indicate that EC training is to be initiated for the current RBA. Optionally, in any of the preceding aspects, a further implementation of the aspect includes sending a request to the one or more processors at the CMTS that EC training is to be initiated for the current RBA. Optionally, in any of the preceding aspects, a further implementation of the aspect includes sending a message to the one or more processors at the first CM to initiate EC training for the current RBA. Optionally, in any of the preceding aspects, a further implementation of the aspect includes performing EC training on the designated channels for the current RBA by transmitting a training signal on an US channel and measuring an echo signal or signal leakage on DS channels adjacent to the US channel.

According to another aspect of the present disclosure, a non-transitory computer-readable medium is provided. The non-transitory computer-readable medium stores computer instructions for CM EC training in FDX coaxial networks, that when executed by one or more processors, cause the one or more processors to perform steps of: receiving a current RBA from a CMTS; determining if any designated channels available for assignment as DS channels or US channels have changed assignment from a previously received RBA; based on the determination that one or more of the designated channels have changed assignment from the previously received RBA, determining that the designated channels have not been assigned as all DS channels or all US channels; based on the determination that the designated channels have not been assigned as all DS channels or all US channels, determining that EC training has not been performed on the designated channels for the current RBA; and based on the determination that EC training has not been performed on the designated channels for the current RBA, performing EC training on the designated channels for the current RBA.

Optionally, in any of the preceding aspects, determining if EC training has been performed on the designated channels for the current RBA includes using a training matrix. Optionally, in any of the preceding aspects, using the training matrix includes using a one-dimensional vector to record binary values as indications of whether EC training has been performed on the designated channels for each of a plurality of possible combinations of RBA, excluding RBAs where the designated channels have been assigned as all DS channels or all US channels. Optionally, in any of the preceding aspects, a further implementation of the aspect includes setting a binary value to indicate EC training has been performed for the current RBA upon completion of EC training on the designated channels for the current RBA. Optionally, in any of the preceding aspects, a further implementation of the aspect includes setting a full EC training indication if all binary values in the one-dimensional vector indicate EC training has been performed for each of the plurality of possible combinations of RBA, excluding RBAs where the designated channels have been assigned as all DS channels or all US channels.

Any one of the foregoing examples may be combined with any one or more of the other foregoing examples to create a new embodiment within the scope of the present disclosure.

This Summary is an overview of some of the teachings of the present application and not intended to be an exclusive or exhaustive treatment of the present subject matter. Further details about the present subject matter are found in the detailed description and appended claims. The scope of the present inventive subject matter is defined by the appended claims and their legal equivalents.

BRIEF DESCRIPTION OF THE DRAWINGS

FIG. 1 is a schematic diagram of an embodiment of a DOCSIS network, according to various embodiments.

FIG. 2A-2B illustrate examples of a resource block assignment (RBA) message, according to various embodiments.

FIG. 4 is a diagram of spectrum assignments for upstream (US) training signals and downstream (DS) measurements, according to various embodiments.

FIG. 5 is a diagram of RBA changes and echo cancellation (EC) training, according to various embodiments.

DETAILED DESCRIPTION

Figure 3:
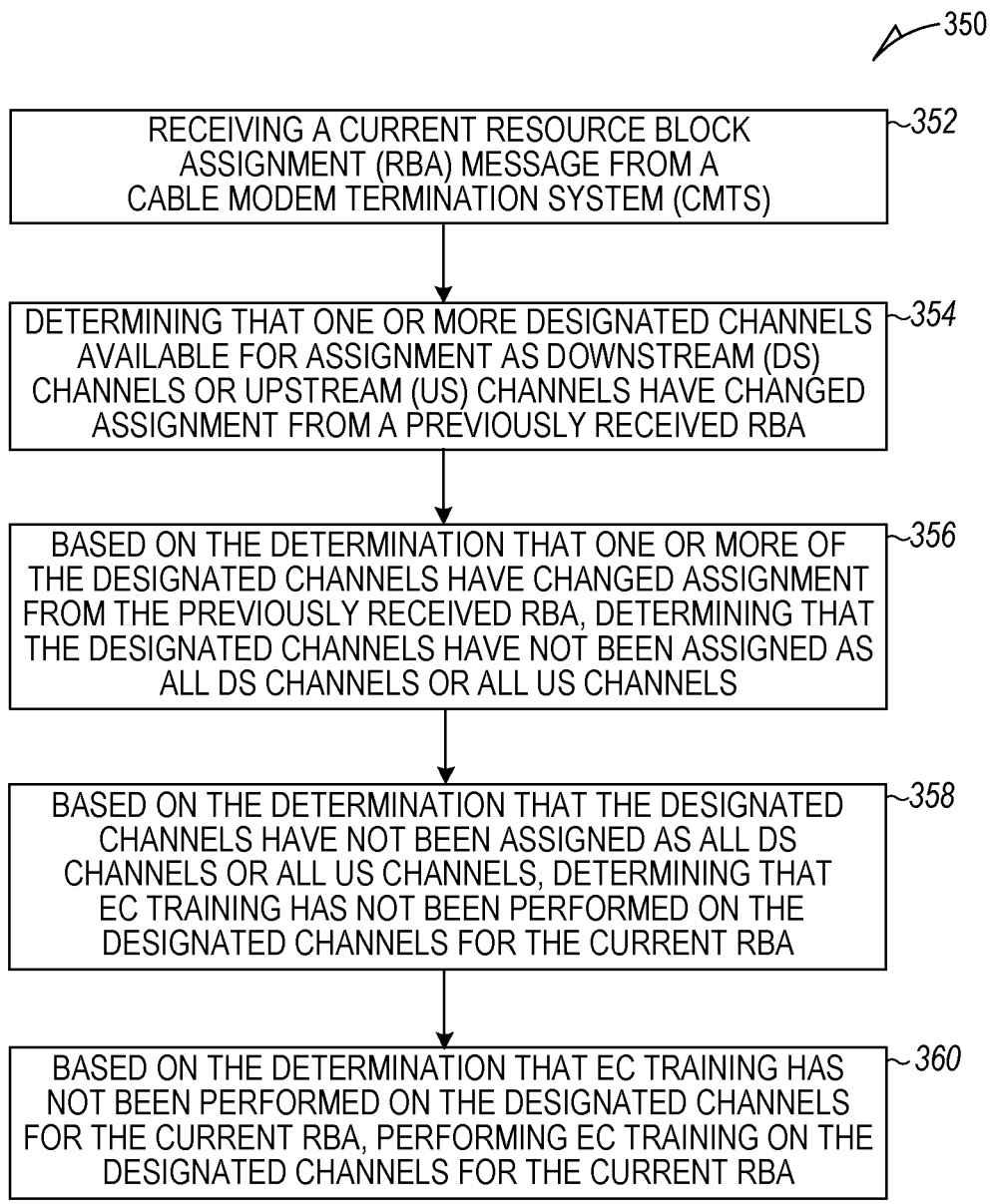
FIG. 3 illustrates a flow diagram for a method for providing CM EC training in FDX coaxial network, according to various embodiments.

In the following description, reference is made to the accompanying drawings that form a part hereof, and in which is shown by way of illustration specific embodiments which may be practiced. These embodiments are described in sufficient detail to enable those skilled in the art to practice the inventive subject matter, and it is to be understood that other embodiments may be utilized and that structural, logical and electrical changes may be made without departing from the scope of the present inventive subject matter. The following description of example embodiments is, therefore, not to be taken in a limited sense, and the scope of the present inventive subject matter is defined by the appended claims.

The following abbreviations and initialisms apply:
ASIC: application-specific integrated circuit
CM: cable modem
CMTS: cable modem termination system
CPU: central processing unit
DOCSIS: Data Over Cable Service Interface Specification
DS: downstream
DSP: digital signal processor
EC: echo cancellation
EO: electrical-to-optical
FDX: full duplex
FPGA: field-programmable gate array
HFC: hybrid fiber-coaxial
IG: interference group
MAC: media access control
MHz: megahertz
OE: optical-to-electrical
RAM: random-access memory
RB: resource block
RBA: RB assignment
ROM: read-only memory
RX: receiver unit
STB: set-top box
SRAM: static RAM
TCAM: ternary content-addressable memory
TG: transmission group
TX: transmitter unit
US: upstream.

A cable modem termination system (CMTS) allocates bandwidth for one or more upstream and/or downstream channels for a CM. Bandwidth allocated to one CM may be allocated across multiple channels upon which the CM can transmit or receive. FDX Data Over Cable Service Interface Specification (DOCSIS) defines sub-bands to be used for either downsteam (DS) transmission to CMs or upstream (US) transmission from CMs. A resource block assignment (RBA) message is transmitted by the CMTS to report or change the RBA for a group of CMs called a transmission group (TG). Each TG represents a group of CMs sharing the same directional access in FDX DOCSIS.

A resource block (RB) represents a unique directional arrangement of one or multiple DS or US FDX channels assigned to a TG. An RB may include a mix of DS or US channels for downstream and upstream transmissions. EC is used to improve FDX CM receiver performance by canceling adjacent leakage interference (ALI) and adjacent channel interference (ACI) resulting from US communications that are adjacent to DS communications. When changing a sub-band direction via an RBA message, it is desirable to train CMs for EC based on the received RBA message. The present subject matter provides for CM EC training in FDX coaxial networks. The present subject matter provides for CM EC training in FDX coaxial networks upon a change in channel direction assignment.

FIG. 1 is a schematic diagram of an embodiment of a DOCSIS network 100, according to various embodiments. The DOCSIS network 100 may be a DOCSIS 3.1 network as specified in DOCSIS 3.1, Physical Layer Specification, May 10, 2017, or DOCSIS 3.1 MAC and Upper Layer Protocols Interface Specification, May 10, 2017 (collectively, "DOCSIS 3.1"), which are incorporated by reference. The DOCSIS network 100 comprises a CMTS 210; an HFC node 230 coupled to the CMTS 210 via an optical fiber 214; and CMs 250 and an STB 252 coupled to the HFC node 230 via electrical cables, amplifiers 236 and 238, and a splitter 240. The HFC node 230 transitions communication from optical fiber 214 lines to coaxial (coax) electrical cables. The amplifiers 236, 238 and additional amplifiers (not shown) are spread along the electrical cables, and are used to maintain signal strength along the electrical cables. The splitter 240 is used to split the signal for transmission to the CMs 250 and the STB 252. The STB 252 converts a digital signal to an analog signal for use with a display.

Full Duplex (FDX) DOCSIS occupies a subset of the radio frequency (RF) spectrum starting at 108 MHz and can extend up to 684 MHz. The Full Duplex spectrum is divided into three sub-bands, in various embodiments. Each of the three sub-bands can be 192 Mhz (684−108=576/3=192 Mhz). In FDX DOCSIS, each of these sub-bands can be defined as either DS or US based on a resource block assignment (RBA) assigned from the CMTS. Each sub-band contains orthogonal frequency-division multiplexing (OFDM) downstream channels and/or upstream orthogonal frequency-division multiple access (OFDMA) channels. The three sub-bands can be either upstream or downstream channels assigned by the RBA, and these three sub-bands can have 8 combinations: all 3 sub-bands can be DS channels, all 3 sub-bands can be US channels, or one sub-band can be DS and two can be US, etc. Thus, a total of 8 sub-band assignments are possible (000, 001, 010, 011, 100, 101, 110, and 111, with 0 being a DS channel and 1 being a US channel). In the case of 000 (all three sub-bands are DS) or 111 (all three sub-bands are US), there is no reason to perform EC as all channels are operating in one direction. EC training is not needed when adjacent channels or sub-bands are assigned a single, common direction. However, in the remaining 6 combinations (001, 010, 011, 100, 101 and 110), a CM performs EC as these combinations have a mix of US and DS channels.

From the CMTS perspective, traffic is simultaneously flowing upstream and downstream in each sub-band. However, from the CM perspective, the spectrum still appears to be frequency-division multiplexed. Each CM uses a sub-band only for upstream or downstream operation for a given time, but one set of CMs can use the sub-band for upstream at the same time that a different set of CMs has been assigned to use that sub-band for downstream.

In various embodiments, each FDX transmission group (TG) is given an RBA, which assigns the direction of traffic in each sub-band for that TG. All CMs within a TG will be assigned with the same RBA, in various embodiments. A TG can use some sub-bands in the upstream direction while using other sub-bands in the downstream direction. While a TG can only use a sub-band in one direction at a given time, the RBA for a TG can be changed, allowing the direction of traffic for that TG in the sub-band to be changed. The CMTS (e.g., the CMTS 210) coordinates the change of the RBA to assure that traffic in one direction is stopped before starting traffic in the opposite direction, in order to prevent interference.

FDX DOCSIS defines sub-bands to be used for either DS transmission to CMs or US transmission from CMs. When changing a sub-band direction via an RBA message, a CM should be trained with a new RBA (except for the cases where all sub-bands are assigned as US or all sub-bands are assigned as DS), either by the CMTS or by self-initiated training Multiple CMs can be trained simultaneously, in an embodiment, or separately in another embodiment.

In one embodiment, an RBA message is transmitted by CMTS in order to report or change the RB assignment for a TG. An RB represents a unique directional arrangement of one or multiple DS or US FDX channels assigned to a TG. An RB may include a mix of DS or US channels. Each TG represents a group of CMs sharing the same directional access in FDX DOCSIS, and a TG can be mapped to one or multiple inference groups (IG). In various embodiments, there are three sub-bands that can be allocated in FDX DOCSIS for the assignment of channel direction to be either upstream or downstream.

The CMTS transmits RBA messages at a periodic interval to inform CMs for RBA currently assigned in a TG. The CMTS transmits RBA messages in order to change the RB assigned to a TG.

FIG. 2A is a first example 200 of RBA, according to various embodiments. The first example 200 divides a cable spectrum into three bands, where the first band 201 and second band 202 are US and the third band 203 is DS.

FIG. 2B is a second example 300 of RBA, according to various embodiments. The second example 300 divides a cable spectrum into three bands, where the first band 301 is US and the second band 302 and third band 303 are DS.

FIG. 3 illustrates a flow diagram for a method 350 for providing CM EC training in FDX coaxial network, according to various embodiments. At operation 352, a processor at a CM receives a current resource block assignment (RBA) message from a cable modem termination system (CMTS), and determines that one or more designated channels available for assignment as downstream (DS) channels or upstream (US) channels have changed assignment from a previously received RBA at operation 354. At operation 356, based on the determination that one or more of the designated channels have changed assignment from the previously received RBA, the processor at the CM determines that the designated channels have not been assigned as all DS channels or all US channels. At operation 358, based on the determination that the designated channels have not been assigned as all DS channels or all US channels, the processor at the CM determines that EC training has not been performed on the designated channels for the current RBA. At operation 360, based on the determination that EC training has not been performed on the designated channels for the current RBA, the processor at the CM performs EC training on the designated channels for the current RBA.

FIG. 4 is a diagram 400 of spectrum assignments for US training signals and DS measurements, according to various embodiments. In one embodiment, the CMs perform echo cancellation, and the present subject matter provides a training mechanism for echo cancellation. The CMs may transmit training signals in an assigned upstream sub-band and measure the training signal in an assigned downstream sub-band. Multiple CMs can be trained simultaneously by a CMTS, or can initiate self-training, in various embodiments. According to various embodiments, the CMs send the training signal in the US channel 402 and measure the training signal in the adjacent DS channels 401, 403.

For a group of CMs which has been assigned a downstream channel to be used for upstream transmission, each CM may use the echo cancellation testing signals to test the noise and signal ratio which may cause interference to other downstream channels which the CM is operating on. Thus, for testing the signal leakage (or to perform the CM's own echo cancellation) from the upstream channel to the downstream channel, the CM will use an allocated time slot to send the echo cancellation test signal and measure the impact in its own downstream channel.

FIG. 5 is a diagram 500 of RBA changes and EC training, according to various embodiments. In the depicted embodiment, an existing RBA has a first channel 511 and third channel 513 assigned as DS and a second channel 512 assigned as US. A new RBA is received by the CM that has the second channel 522 and third channel 523 assigned as DS and the first channel 521 assigned as US. According to this embodiment, for the new RBA, the CMs send the training signal in the US channel 503 and measure the training signal in the adjacent DS channels 501, 502. In general for the EC training at the CMs' side, a CM can send a training signal on the US which is included in the RBA message sent from the CMTS to the CM. For example, if a current RBA message has one US sub-band, the CM sends the training signal in this US channel and measures the echo at the other DS channel. If the new RBA changes channel assignment to the CM, the CM performs EC training based on a received new RBA, according to various embodiments.

In various embodiments, there are various ways to initiate CM EC training. In one embodiment, a CM initiates self-training. In another embodiment, a CM requests the CMTS for training (request and grant), such as by using an indicate message to request training. In a further embodiment, the CMTS initiates EC training, and the CMTS may use an indicate message to instruct a CM to do EC training, such as a mobile application part (MAP) message. After RBA changes, the CM can decide whether the CM should perform EC training based on a look-up table or matrix stored in the CM, in an embodiment. In another embodiment, after RBA changes, the CMTS decides whether the CM should perform EC training based on a look-up table or matrix stored in the CMTS.

Figure 6:
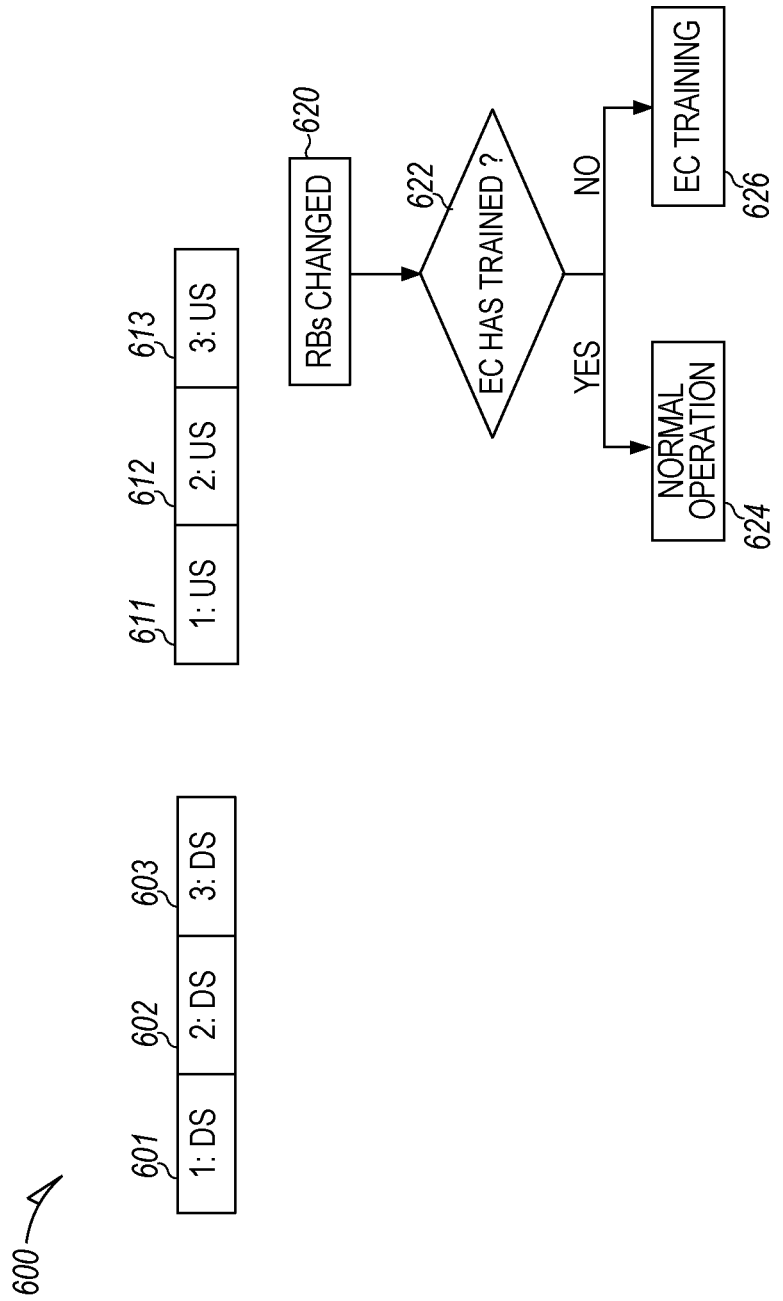
FIG. 6 is a diagram illustrating when a cable modem (CM) may not be required to do training, according to various embodiments.

FIG. 6 is a diagram 600 demonstrating when a CM may not be required to do training, according to various embodiments. In a first scenario, all FDX channels 601, 602, 603 are DS. In a second scenario, all FDX channels 611, 612, 613 are US only. In those scenarios, the CM may not have to perform EC training as all traffic is unidirectional. For other scenarios, the CM does training if the assigned channel configuration has not been trained.

According to various embodiments, when a received RBA indicates that RBs have changed 620, the CM determines (operation 622) whether EC training has been performed on this RBA. If not, EC training is initiated (operation 626). If EC training has been performed on this RBA, the CM continues with normal operation (operation 624).

Currently, the FDX bands are three sub-bands, which are 24/64/96/192 MHz. Within the assigned 3 sub-bands, there are a total of eight DS/US RBA combinations that may be made: 000, 001, 010, 011, 100, 101, 110, and 111, where 1 indicates US and 0 indicates DS. Based on CM EC training mechanisms, if all sub-bands are DS channels (000) or all sub-bands are US channels (111), then there is no reason to perform EC training. For the other six RBA scenario combinations (001, 010, 011, 100, 101, 110), the CM performs EC training when receiving the RBA changes, in various embodiments.

Figure 7:
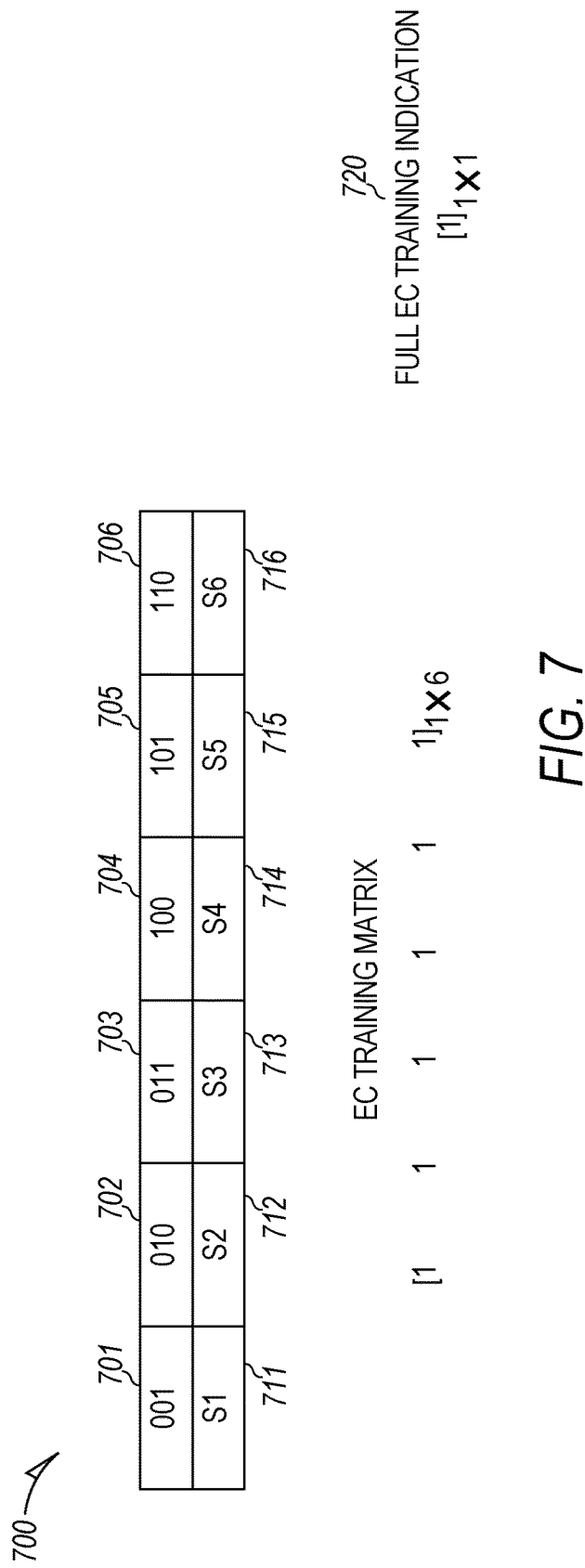
FIG. 7 is a diagram of a look-up table in matrix form for determining whether training should be initiated for a CM, according to various embodiments.

FIG. 7 is a diagram 700 of a look-up table in matrix form for determining whether training should be initiated for a CM, according to various embodiments. The state machine may be in the CMTS, the CM, or both to determine whether training is needed. Either the CMTS or the CM determines if the assigned US has trained or not after RBA changes. The following method can provide a quick look up to decide if the training is required for new assigned US channels. First, the CM or CMTS can set a one-dimensional vector 711, 712, 713, 714, 715, 716 to record whether the EC training has been done or not with the specific scenario 701, 702, 703, 704, 705, 706 of RB assignment. Each scenario 701-706 includes a binary indication that can be transformed to the related number (S1, S2, S3, S4, S5, S6). Second, for convenience, the CM or CMTS can also set one full EC training indication 720 if all scenarios in the matrix have been trained, to let the CMTS/CM rapidly determine whether EC training should be initiated.

Figure 8:
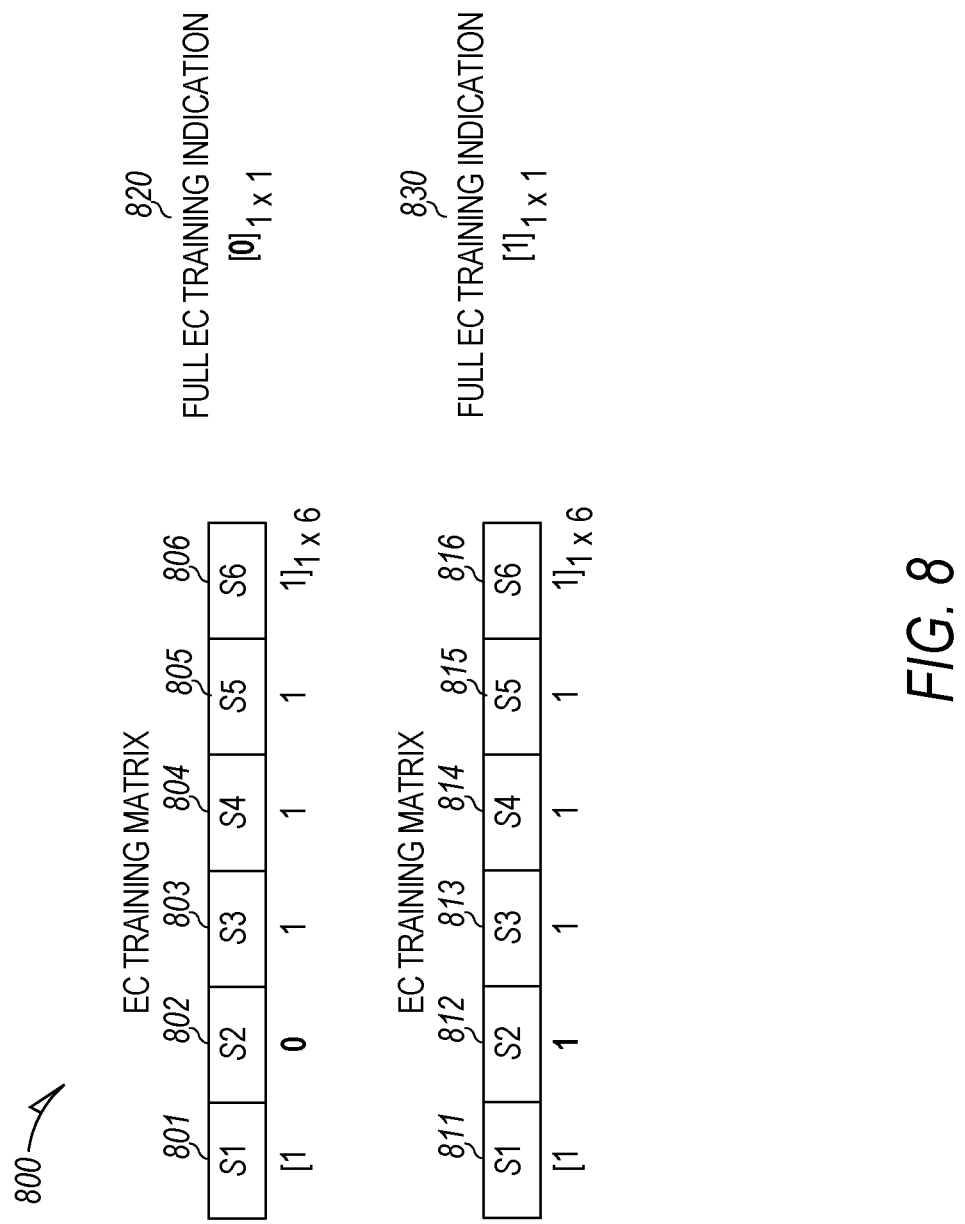
FIG. 8 is another diagram of a look-up table in matrix form for determining whether training should be initiated for a CM, according to various embodiments.

FIG. 8 is another diagram 800 of a look-up table in matrix form for determining whether training should be initiated for a CM, according to various embodiments. The state machine may be in the CMTS, the CM, or both to determine whether training is needed. In one example, the CM determines whether an EC training has been completed for RB assignment 010. In a first step, the CM checks whether the full EC training indication 820 is 1 or 0. In this example, it is 0, so full EC training is not achieved. In a second step, the CM locates the scenario 802 of RBA EC training indication within the EC training matrix of scenarios 801, 802, 803, 804, 805, and 806. For RB 010, the related number is 2 (at scenario 802), and the indication is 0, meaning the CM has not done the EC training yet with this RBA. The CM will make a request to train the new assigned US to the CMTS, in an embodiment. The CMTS grants the request and sends a message to the CM to perform EC training, and the CM will mark the indication at 802 to 1. In a third step, the CM performs normal operations. If all the indications for all scenarios 811, 812, 813, 814, 815, and 816 within the EC training matrix are 1, then the CM changes the full EC training indication 830 to 1.

There are eight states (for three DOCSIS FDX sub-bands) related to RBA changes, wherein six of the eight state changes use the CM to perform EC training, since, as stated above, no training is needed if all channels are US or all channels are DS. One or multiple CMs can be trained simultaneously, in various embodiments. Based on RBA state changes, the CM performs EC training using a look-up table or matrix. After receiving RBA changes from the CMTS, the CM examines the designed matrix array to decide if the received RBA has been previously trained. If not, then the CM performs EC training. The CMTS can instruct the CM to do EC training, or the CM can request to do EC training to CMTS and the CMTS can grant the request. If the CM is rebooted, then the EC training status bits will be reset. The CMTS can power cycle all connected CMs to begin a reset, in various examples.

In various embodiments, the CMTS initiates FDX band operations for an FDX-capable CM at some point after registration. The CM and the CMTS complete sounding and the CM is assigned a TG and the current RBA. The CM then acquires the FDX downstream and upstream channels, and is now ready for EC training Echo cancellation is used to improve FDX CM receiver performance by cancelling Adjacent Leakage Interference (ALI) and Adjacent Channel Interference (ACI) resulting from upstream transmissions.

The CM trains its EC for each downstream channel for each RBA that includes both upstream and downstream directions. There are two phases to EC training: initial and periodic. Initial EC Training is used to initially train the CM's EC for a given RBA. Once the CM has trained on an RBA, periodic EC training is used to keep the CM's EC working optimally.

The CM maintains downstream RBA EC training status, in various embodiments. If the RBA switches to an RBA on which the CM has not previously trained or if the previous training parameters are no longer valid, the CM may need to repeat initial EC training, according to various embodiments.

Figure 9:
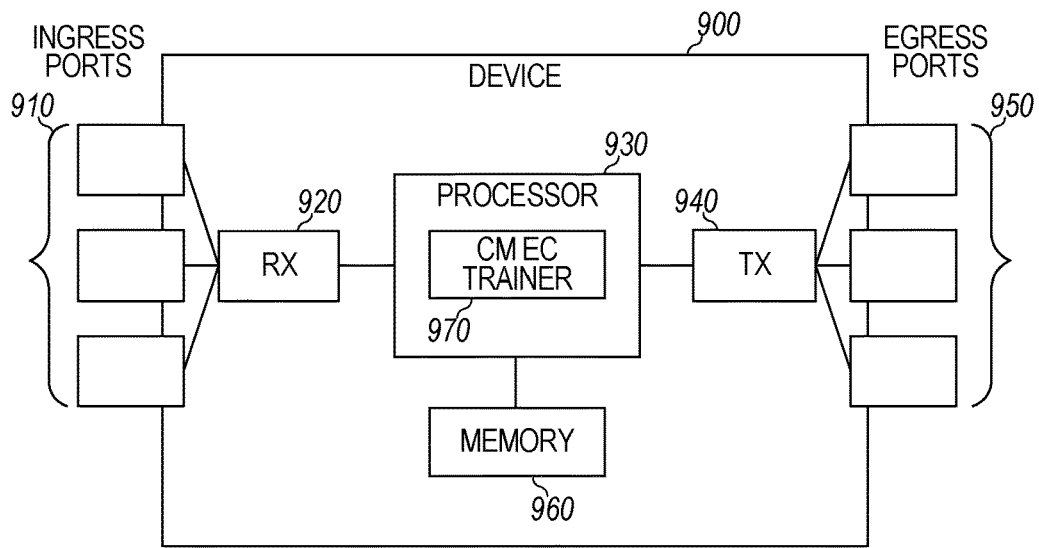
FIG. 9 is a schematic diagram of a device, according to an embodiment of the disclosure.

FIG. 9 is a schematic diagram of a device 900 according to an embodiment of the disclosure. The device 900 may implement the disclosed embodiments. The device 900 comprises ingress ports 910 and an RX 920 that receive data; a processor, logic unit, or CPU 930 that processes the data; a TX 940 that transmits the data; and a memory 960 that stores the data. The device 900 may also comprise OE components and EO components coupled to the ingress ports 910, the RX 920, the TX 940, and the egress ports 950 for ingress or egress of optical or electrical signals.

The processor 930 is any suitable combination of hardware, middleware, firmware, or software. The processor 930 comprises any combination of one or more CPU chips, cores, FPGAs, ASICs, or DSPs. The processor 930 communicates with the ingress ports 910, RX 920, TX 940, egress ports 950, and memory 960. The processor 930 comprises a CM EC trainer 970, which implements the disclosed embodiments. The inclusion of the CM EC trainer 970 therefore provides a substantial improvement to the functionality of the device 900 and effects a transformation of the device 900 to a different state. Alternatively, the memory 960 stores the CM EC trainer 970 as instructions, and the processor 930 executes those instructions.

The memory 960 comprises one or more disks, tape drives, or solid-state drives. The device 900 may use the memory 960 as an over-flow data storage device to store programs when the device 900 selects those programs for execution and to store instructions and data that the device 900 reads during execution of those programs. The memory 960 may be volatile or non-volatile and may be any combination of ROM, RAM, TCAM, or SRAM.

Figure 10:
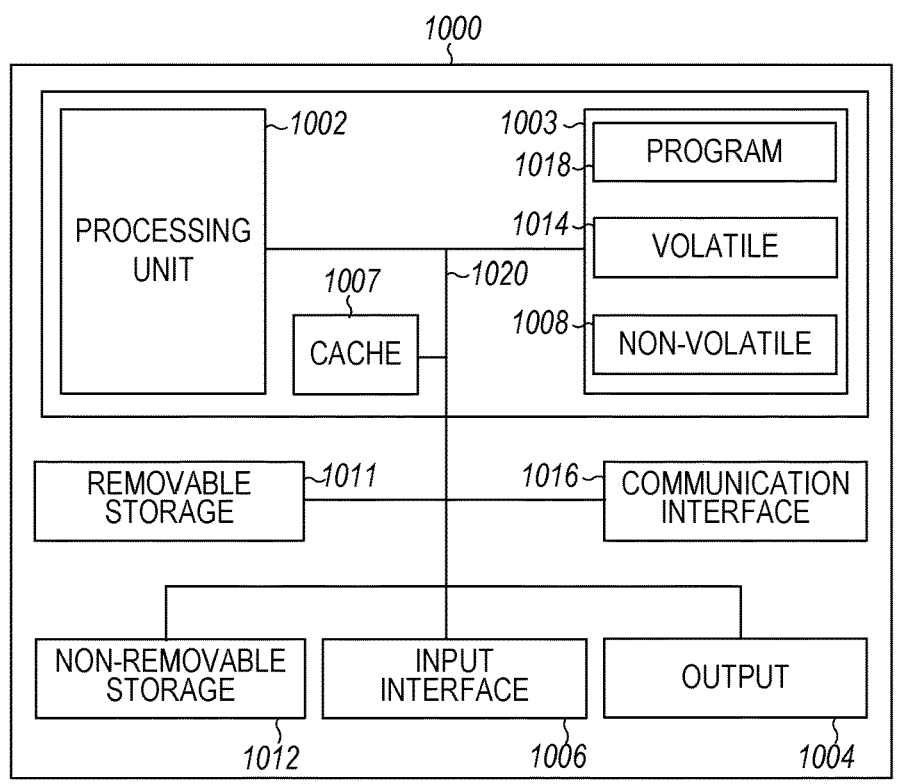
FIG. 10 is a schematic diagram illustrating circuitry for performing methods according to example embodiments.

FIG. 10 is a schematic diagram illustrating circuitry for performing methods according to example embodiments. All components need not be used in various embodiments. For example, the computing devices may each use a different set of components and storage devices.

One example computing device in the form of a computer 1000 may include a processing unit or processor 1002, memory 1003, cache 1007, removable storage 1011, and non-removable storage 1012, all coupled by a bus 1020. Although the example computing device is illustrated and described as a computer 1000, the computing device may be in different forms in different embodiments. For example, the computing device may be a router or other computing device including the same or similar elements as illustrated and described with regard to FIG. 10. Further, although the various data storage elements are illustrated as part of the computer 1000, the storage may also or alternatively include cloud-based storage accessible via a network, such as the Internet or server-based storage.

In FIG. 10, memory 1003 may include volatile memory 1014 and/or non-volatile memory 1008. Computer 1000 may include—or have access to a computing environment that includes—a variety of computer-readable media, such as volatile memory 1014 and/or non-volatile memory 1008, removable storage 1011 and/or non-removable storage 1012. Computer storage includes random access memory (RAM), read only memory (ROM), erasable programmable read-only memory (EPROM) or electrically erasable programmable read-only memory (EEPROM), flash memory or other memory technologies, compact disc read-only memory (CD ROM), Digital Versatile Disks (DVD) or other optical disk storage, magnetic cassettes, magnetic tape, magnetic disk storage or other magnetic storage devices, or any other medium capable of storing computer-readable instructions. Storage can also include networked storage such as a storage area network (SAN).

Computer 1000 may include or have access to a computing environment that includes an input interface 1006, an output interface 1004, and a communication interface 1016. In various embodiments, communication interface 1016 includes a transceiver and an antenna. Output interface 1004 may include a display device, such as a touchscreen, that also may serve as an input device. The input interface 1006 may include one or more of a touchscreen, touchpad, mouse, keyboard, camera, one or more device-specific buttons, one or more sensors integrated within or coupled via wired or wireless data connections to the computer 1000, or other input devices. The computer 1000 may operate in a networked environment using a communication connection to connect to one or more remote computers, such as database servers. The remote computer may include a personal computer (PC), server, router, network PC, a peer device or other common network node, or the like. The communication connection may include a Local Area Network (LAN), a Wide Area Network (WAN), cellular, WiFi, Bluetooth®, or other networks.

Computer-readable instructions, i.e., a program 1018, comprises instructions stored on a computer-readable medium that are executable by the processor 1002 of the computer 1000. The terms "computer-readable medium" and "storage device" do not include carrier waves to the extent carrier waves are deemed too transitory. In one example, the processor 1002 executes the program 1018 to implement methods for CM EC training in FDX coaxial networks.

Although a few embodiments have been described in detail above, other modifications are possible. For example, the logic flows depicted in the figures do not require the particular order shown, or sequential order, to achieve desirable results. Other steps may be provided, or steps may be eliminated, from the described flows, and other components may be added to, or removed from, the described systems. Other embodiments may be within the scope of the following claims.

Although the present disclosure has been described with reference to specific features and embodiments thereof, it is evident that various modifications and combinations can be made thereto without departing from the scope of the disclosure. The specification and drawings are, accordingly, to be regarded simply as an illustration of the disclosure as defined by the appended claims, and are contemplated to cover any and all modifications, variations, combinations, or equivalents that fall within the scope of the present disclosure.

What is claimed is:

1. A method for cable modem (CM) echo cancellation (EC) training in full duplex (FDX) coaxial networks, the method comprising:
   receiving, by a processor at a CM, a current resource block assignment (RBA) message from a cable modem termination system (CMTS);
   determining, by the processor at the CM, that one or more designated channels available for assignment as downstream (DS) channels or upstream (US) channels have changed assignment from a previously received RBA;
   based on the determination that one or more of the designated channels have changed assignment from the previously received RBA, determining, by the processor at the CM, that the designated channels have not been assigned as all DS channels or all US channels;
   based on the determination that the designated channels have not been assigned as all DS channels or all US channels, determining, by the processor at the CM, that EC training has not been performed on the designated channels for the current RBA; and
   based on the determination that EC training has not been performed on the designated channels for the current RBA, performing, by the processor at the CM, EC training on the designated channels for the current RBA.

2. The method of claim 1, wherein determining if any of the designated channels have changed assignment from a previously received RBA includes determining, by the processor at the CM, if any of three designated channels have changed assignment from a previously received RBA.

3. The method of claim 1, wherein determining if EC training has been performed on the designated channels for the current RBA includes using, by the processor at the CM, a look-up table.

4. The method of claim 1, wherein determining if EC training has been performed on the designated channels for the current RBA includes using, by the processor at the CM, a training matrix.

5. The method of claim 4, wherein using the training matrix includes using, by the processor at the CM, a one-dimensional vector to record binary values as indications of whether EC training has been performed on the designated channels for each of a plurality of possible combinations of RBA, excluding RBAs where the designated channels have been assigned as all DS channels or all US channels.

6. The method of claim 5, further comprising:
   setting, by the processor at the CM, a binary value to indicate EC training has been performed for the current RBA upon completion of EC training on the designated channels for the current RBA.

7. The method of claim 5, further comprising:
   setting, by the processor at the CM, a full EC training indication if all binary values in the one-dimensional vector indicate EC training has been performed for each of the plurality of possible combinations of RBA, excluding RBAs where the designated channels have been assigned as all DS channels or all US channels.

8. The method of claim 1, further comprising:
   sending, by the processor at the CM, a notification to the CMTS to indicate that EC training is to be initiated for the current RBA.

9. The method of claim 1, wherein performing EC training on the designated channels for the current RBA includes transmitting, by the processor at the CM, a training signal on an US channel and measuring, by the processor at the CM, an echo signal or signal leakage on DS channels adjacent to the US channel.

10. The method of claim 1, further comprising:
    sending, by the processor at the CM, a request to the CMTS that EC training is to be initiated for the current RBA; and
    receiving, by the processor at the CM, a grant from the CMTS that EC training can be initiated for the current RBA.

11. A system for CM EC training in FDX coaxial networks, the system comprising:
    one or more processors at a CMTS, the one or more processors at the CMTS configured to:
    send a current RBA to a plurality of CMs; and
    one or more processors at a first CM of the plurality of CMs, the one or more processors at the first CM configured to:
    receive the current RBA from the CMTS;
    determine if any designated channels available for assignment as DS channels or US channels have changed assignment from a previously received RBA;
    based on the determination that one or more of the designated channels have changed assignment from the previously received RBA, determine that the designated channels have not been assigned as all DS channels or all US channels;
    based on the determination that the designated channels have not been assigned as all DS channels or all US channels, determine that EC training has not been performed on the designated channels for the current RBA; and
    based on the determination that EC training has not been performed on the designated channels for the current RBA, perform EC training on the designated channels for the current RBA.

12. The system of claim 11, wherein the one or more processors at the first CM is further configured to:
    send a notification to the one or more processors at the CMTS to indicate that EC training is to be initiated for the current RBA.

13. The system of claim 11, wherein the one or more processors at the first CM is further configured to:
    send a request to the one or more processors at the CMTS that EC training is to be initiated for the current RBA.

14. The system of claim 13, wherein the one or more processors at the CMTS is further configured to:
    send a message to the one or more processors at the first CM to initiate EC training for the current RBA.

15. The system of claim 11, wherein the one or more processors at the first CM is configured to perform EC training on the designated channels for the current RBA by transmitting a training signal on an US channel and measuring an echo signal or signal leakage on DS channels adjacent to the US channel.

16. A non-transitory computer-readable medium storing computer instructions for CM EC training in FDX coaxial networks, that when executed by one or more processors, cause the one or more processors to perform steps of:
    receiving a current RBA from a CMTS;
    determining if any designated channels available for assignment as DS channels or US channels have changed assignment from a previously received RBA;
    based on the determination that one or more of the designated channels have changed assignment from the previously received RBA, determining that the designated channels have not been assigned as all DS channels or all US channels;
    based on the determination that the designated channels have not been assigned as all DS channels or all US channels, determining that EC training has not been performed on the designated channels for the current RBA; and
    based on the determination that EC training has not been performed on the designated channels for the current RBA, performing EC training on the designated channels for the current RBA.

17. The computer-readable medium of claim 16, wherein determining if EC training has been performed on the designated channels for the current RBA includes using a training matrix.

18. The computer-readable medium of claim 17, wherein using the training matrix includes using a one-dimensional vector to record binary values as indications of whether EC training has been performed on the designated channels for each of a plurality of possible combinations of RBA, excluding RBAs where the designated channels have been assigned as all DS channels or all US channels.

19. The computer-readable medium of claim 18, the steps further comprising:
    setting a binary value to indicate EC training has been performed for the current RBA upon completion of EC training on the designated channels for the current RBA.

20. The computer-readable medium of claim 18, the steps further comprising:
    setting a full EC training indication if all binary values in the one-dimensional vector indicate EC training has been performed for each of the plurality of possible combinations of RBA, excluding RBAs where the designated channels have been assigned as all DS channels or all US channels.

* * * * *